UNITED STATES PATENT OFFICE.

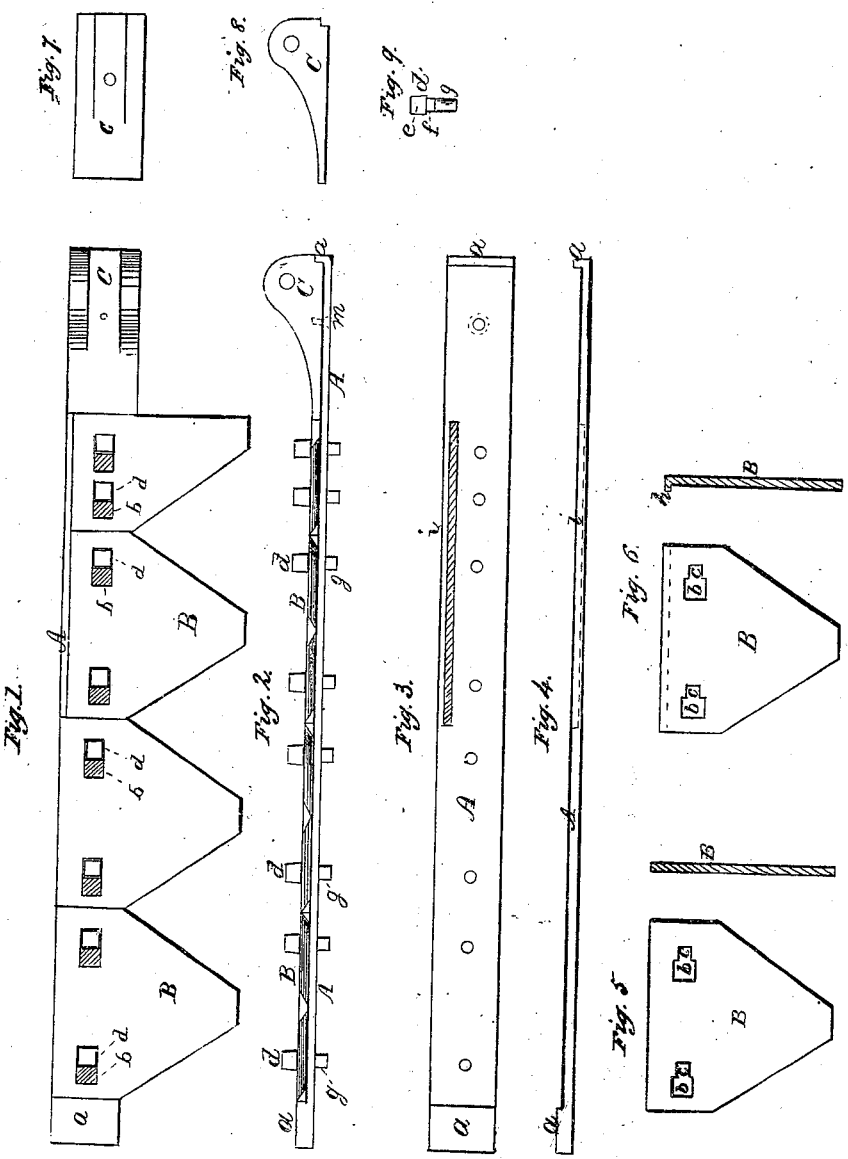

R. W. McCLELLAND, OF SPRINGFIELD, ILLINOIS.

IMPROVEMENT IN HARVESTERS.

Specification forming part of Letters Patent No. 42,009, dated March 22, 1864.

*To all whom it may concern:*

Be it known that I, R. W. McCLELLAND, of Springfield, in the county of Sangamon and State of Illinois, have invented certain new and useful Improvements in the Cutting Apparatus of Harvesting-Machines; and I do hereby declare that the following is a full, clear, and exact description of the same, reference being had to the accompanying drawings, making a part of this specification, in which—

Figure 1 represents a top-plan of the cutting apparatus. Fig. 2 represents a front or edge view of the same. Fig. 3 represents a top plan of the cutter-bar detached. Fig. 4 represents a front or edge view of the same. Figs. 5 and 6 represent plans and sections of the sickles or blades. Fig. 7 represents a top plan of the head to which the pitman is connected, said head being detachable and represented as detached from the cutter-bar. Fig. 8 represents a side elevation of the pitman-head. Fig. 9 represents one of sickle-rivets detached.

Similar letters of reference, where they occur in the several separate figures, denote like parts in all the drawings.

I am aware that the sickle sections or blades on a harvesting-machine cutter-bar have been so made and united to the bar as to be susceptible of being taken off separately for being ground or for repairs; but the connection has been so intricate, requiring so many pieces and so much fitting up of the parts, as to prevent them from going into general use. I have so simplified the connection between the sections, blades, or sickles and the sickle-bar as to make them efficient, and still cheap enough to admit of their universal adoption, as I will now explain in connection with the drawings.

The sickle-bar A is made of iron or steel, and turned up at both of its ends, as at *a a*, so as to form shoulders against which the sickle sections or blades B are wedged or held, as will be hereinafter explained.

The sickle sections or blades B may be made of steel in any of the usual forms for cutting grain or grass, and have two square holes, *b b*, punched in each section, from which holes project, in a direction lengthwise with the sickle-bar, slots *c c*, as distinctly shown in Figs. 5 and 6.

Upon the sickle-bar A are arranged, so as to match the holes and slots *b c* of the blades, a series of pins or rivets, *d*, the heads *e* of which may be square or round, the holes *b* being, however, of a similar form, and the portion *f* thereof being square, while the shank *g* may be round. These pins or rivets, when placed and secured in the cutter-bar, may project both above and below the cutters and cutter-bar, as shown, in which event they will act as clearers in the guards or fingers; or they may be left flush below, with very slight projection above, just enough to allow the blades to lie under their heads. The slots *c* of these sections, when shoved up into place on the bar, take against the square portions *f* of the rivets, which in ordinary cases will be sufficient, when the end wedge or support is put on, to hold the sections firmly to the bar; but if more bracing be necessary, then the back edge, *h*, of the sections may be turned down, so as to form a flange thereon, which flange may enter a longitudinal groove or slot, *i*, made in the finger-bar; but, as before stated, except for very heavy cutting, the flange and groove will not be found necessary.

When the sections or blades are laid over the heads of the rivets, and then slipped toward the outer end of the bar, until the slots *c* take under the heads of the rivets, the outer section of the series should find a bearing against the shoulder *a*, turned or formed on that end of the cutter-bar. Then by placing the head C against the inner or half section at the other end of the bar, and against the other shoulder *a*, and securing it there by a screw, *m*, or other device, the whole series of sections as well as the head C are firmly united to the sickle-bar. By removing the head C and sliding the sections toward the position occupied by said head, then the sections may be lifted off ground and returned, or be replaced by others, as may be desired.

The head C may act as a wedge, if necessary, so as to force all the sections up to their exact places; or a small wedge or key may be inserted between the head and last section to accomplish the same purpose.

Having thus fully described the nature, object, and purpose of my invention, what I claim is—

1. In combination with a shoulder at each end of the sickle-bar, the square-shanked rivets $d$ and the sickle-sections B, with their holes and slots, for the purpose of holding said sections to the bar in a direction transverse as well as longitudinal to said bar, and this I claim whether the flange $h$ and groove $i$ be used or not, substantially as described.

2. In combination with a shouldered sickle-bar, the series of removable blades and the removable head secured thereto, substantially as and for the purpose described.

R. W. McCLELLAND.

Witnesses:
 L. B. ADAMS,
 JOSEPH WALLACE.